US006968134B1

(12) United States Patent
Wiesmann et al.

(10) Patent No.: US 6,968,134 B1
(45) Date of Patent: Nov. 22, 2005

(54) METHOD AND ARRANGEMENT FOR MEASURING THE SIGNAL QUALITY IN AN OPTICAL TRANSMISSION SYSTEM

(75) Inventors: Rainer Wiesmann, Geltendorf (DE); Christoph Glingener, Feldkirchen-Westerham (DE); Oliver Bleck, München (DE); Björn Heppner, München (DE); Ernst Müllner, München (DE); Albrecht Neudecker, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,878

(22) PCT Filed: Mar. 1, 2000

(86) PCT No.: PCT/DE00/00608

§ 371 (c)(1),
(2), (4) Date: Oct. 1, 2001

(87) PCT Pub. No.: WO00/60800

PCT Pub. Date: Mar. 31, 2000

(30) Foreign Application Priority Data

Mar. 31, 1999 (DE) .............................. 199 14 793

(51) Int. Cl.[7] ........................................... H04B 7/212
(52) U.S. Cl. .................... 398/183; 398/185; 398/186; 398/25
(58) Field of Search ..................... 398/9, 183, 181, 398/203, 59, 25; 370/347

(56) References Cited

U.S. PATENT DOCUMENTS

| 5,528,596 | A | * | 6/1996 | Fisher et al. ................ 370/347 |
| 5,585,954 | A |   | 12/1996 | Taga et al. |
| 6,396,601 | B1 | * | 5/2002 | Takara et al. .................. 398/9 |

FOREIGN PATENT DOCUMENTS

| DE | 195 04 896 | 8/1996 |
| DE | 19 717 643 | 11/1998 |

OTHER PUBLICATIONS

Takashita, H.; Optical Fiber Communication Conference (OFC) 99, San Diego, California, FJ 2-1, an article titled: "A novel data formal free bit-by-bit quasi-error monitoring method for optical transport network", pp. 149-151.

Glingener, C.; "Modellierung und Simulation faseroptischer Netze mit Wellenlangenmultiplex" (Modelling and simulation of Fiber-Optic Networks with Wavelength Division Multiplexing), WFT-Verlag, 1998, pp. 102-118.

* cited by examiner

Primary Examiner—M. R. Sedighian
Assistant Examiner—David C. Payne
(74) Attorney, Agent, or Firm—Bell, Boyd & Lloyd LLC (57) ABSTRACT

A received binary signal (BS) is sampled with different thresholds, the sampling results are integrated and stored. The measured probability distributions or probability density distributions can be used to draw conclusions concerning the signal quality (for example, the bit error rate) and to optimize the system.

26 Claims, 8 Drawing Sheets

METHOD AND ARRANGEMENT FOR MEASURING THE SIGNAL QUALITY IN AN OPTICAL TRANSMISSION SYSTEM

BACKGROUND OF THE INVENTION

1. Field of the Invention

The invention relates to methods for measuring distribution functions for determining the signal quality in an optical transmission systems. A suitable arrangement makes it possible to measure the statistical properties and main signal parameters. The measurement results can be used for improving the signal quality, for example, for optimizing the dispersion compensation.

Statements concerning the quality of a received binary signal, and consequently also the properties of the transmission system and the transmission link, can be made based on statistical evaluations and measurements of distribution functions. These statements can in turn be used for optimizing the system, for example, for setting an optimum sampling instant, for setting an optimum sampling threshold, or for dispersion compensation.

2. Description of the Related Art

German patent document DE 195 04 896 A1 discloses signal quality monitoring of transparent optical networks in which a random signal sampling is performed. The random amplitude samples obtained in this way are evaluated using a known statistical method. German patent document DE 198 17 078.8 further develops this method by evaluating only the outer edges of a probability density function derived from the measurement results. This allows, for example, the bit error rate to be estimated. However, this method requires very fast sampling and storing capabilities.

U.S. Pat. No. 5,585,954 describes an arrangement for measuring the error rate in the case of different decision-circuit threshold values based on a predetermined pseudo-random sequence, used for determining the transmission characteristic. However, the data transmission has to be interrupted for this purpose. The measured bit error rate is only conditionally suitable for establishing non-linear effects.

In a paper by Hitoshi Takashita and Naoya Henmi Optical Fiber Communication Conference (OFC) 99, San Diego, Calif., FJ 2-1, pp. 149–151, an article titled "A novel data format free bit-by-bit quasi-error monitoring method for optical transport network" describes the use of a receiving circuit with two sampling circuits which have different thresholds. By sampling the binary signal with two different thresholds, a quasi bit error rate is measured and a direct correlation with the bit error rate is established. No further statistical statements are made.

SUMMARY OF THE INVENTION

The object of the invention is to provide measuring methods for determining distribution functions which can be statistically evaluated.

Further inventive objects include providing an application for improving the signal quality, for example, by optimizing the dispersion compensation, and a suitable measuring arrangement.

Building on a basis of the article described above "A novel data format free bit-by-bit quasi-error monitoring method for optical transport network", the main object is achieved by an embodiment of a method of measuring a distribution function for determining a signal quality in optical transmission systems, comprising the steps of sampling an optical binary signal in a working channel with a first threshold value, producing first sampling values; additionally sampling the optical binary signal in a measuring channel with a second threshold value during a plurality of measuring intervals in which in each case the second threshold value is varied, producing second sampling values; comparing respective the first sampling values with the second sampling values, producing comparison values; integrating or summating the comparison values to produce, for each measuring interval, a summated comparison value; storing the summated comparison values; determining a distribution function of the comparison values as a function of the second variable threshold value after an adequate number of the measuring intervals; and improving the signal quality or optimizing the optical transmission system utilizing the distribution function.

In a further embodiment, the inventive object is achieved by a method of measuring a distribution function for determining a signal quality in optical transmission systems, comprising the steps of sampling an optical binary signal in a working channel with a first threshold value, producing first sampling values; additionally sampling the optical binary signal in a measuring channel with a second threshold value during a plurality of measuring intervals in which in each case the second threshold value is varied, producing second sampling values; determining, for each the measuring interval, a first summated value in the measuring channel by integrating sampled logical zeros or ones; storing the first summated values; determining, for each measuring interval, a number of bits received as a summated bit value; storing the summated bit values; determining a probability function, after an adequate number of the measuring intervals, as a function of the variable second threshold value for an occurrence of a binary state from the stored first summated values and associated the summated bit values; and improving the signal quality or optimizing the optical transmission system utilizing the distribution function.

In a further embodiment, the inventive object is achieved by a method of measuring a distribution function for determining a signal quality in optical transmission systems, comprising the steps of sampling an optical binary signal in a working channel with a first threshold value, producing first sampling values; additionally sampling the optical binary signal in a measuring channel with a second threshold value during a plurality of measuring intervals in which in each case the second threshold value is varied, producing second sampling values; determining, for each the measuring interval, a first summated value in the measuring channel by integrating sampled logical zeros or ones; storing the first summated values; determining, for each measuring interval, a second summated value in the working channel by integrating received zeros or ones; storing the second summated values; determining a probability function, after an adequate number of the measuring intervals, as a function of the variable second threshold value for an occurrence of a binary state from the stored first summated values and associated the second summated values; and improving the signal quality or optimizing the optical transmission system utilizing the distribution function.

The above methods can be applied by a method that further comprises the steps of measuring probability distributions with differently set dispersion values; storing measurement results; and obtaining, from the stored measurement results, an at least approximately optimum value for dispersion compensation.

These methods may be utilized in an inventive arrangement for measuring the signal quality of WDM signals, comprising a channel selection circuit, with which a WDM channel is in each case selected; an optoelectronic conversion device that converts an optical signal; and a measuring device that is fed a signal after conversion by the optoelectronic conversion device that utilizes a probability distribution and determines a signal-to-noise ration as a main signal parameter.

It is advantageous in the case of the first described method that, by varying the threshold of a second decision circuit from measuring interval to measuring interval and by comparison of the sampled data, a probability distribution is measured and can be used to determine the distribution density function for the occurrence of specific receiving levels at the sampling instants—the sampled values. It is advantageous for the sampling to be followed by an integration of the binary decisions, so that only simple and slow processing is required.

A particularly advantageous design of the invention dispenses with the comparison of the bits sampled with different thresholds and counts (integrations) within each measuring interval the bits assessed in the case of a specific threshold as logical ones (or as logical zeros) and also the number of bits. In the case of unbalanced codings, the number of logical ones (or logical zeros) in the working channel can also be assessed in order to avoid fluctuations when there are different distributions of the binary states. The probability function is again determined from a large number of measurements with different sampling thresholds.

The use of a plurality of measuring channels with different sampling thresholds allows the measuring time to be reduced considerably.

On the basis of the distribution curves measured, the quality of the received binary signal, and consequently the properties of the optical transmission system, can be concluded. The knowledge gained can be used for optimizing the system, for example, the sampling and the dispersion compensation.

A suitable measuring device can carry out, in time-division multiplex mode, both the main signal parameters such as wavelength, power, signal-to-noise ratio and also statistical measurements.

DESCRIPTION OF THE DRAWINGS

The invention is explained in more detail on the basis of exemplary embodiments and drawings described below.

DETAILED DESCRIPTION OF THE INVENTION

Figure 1:
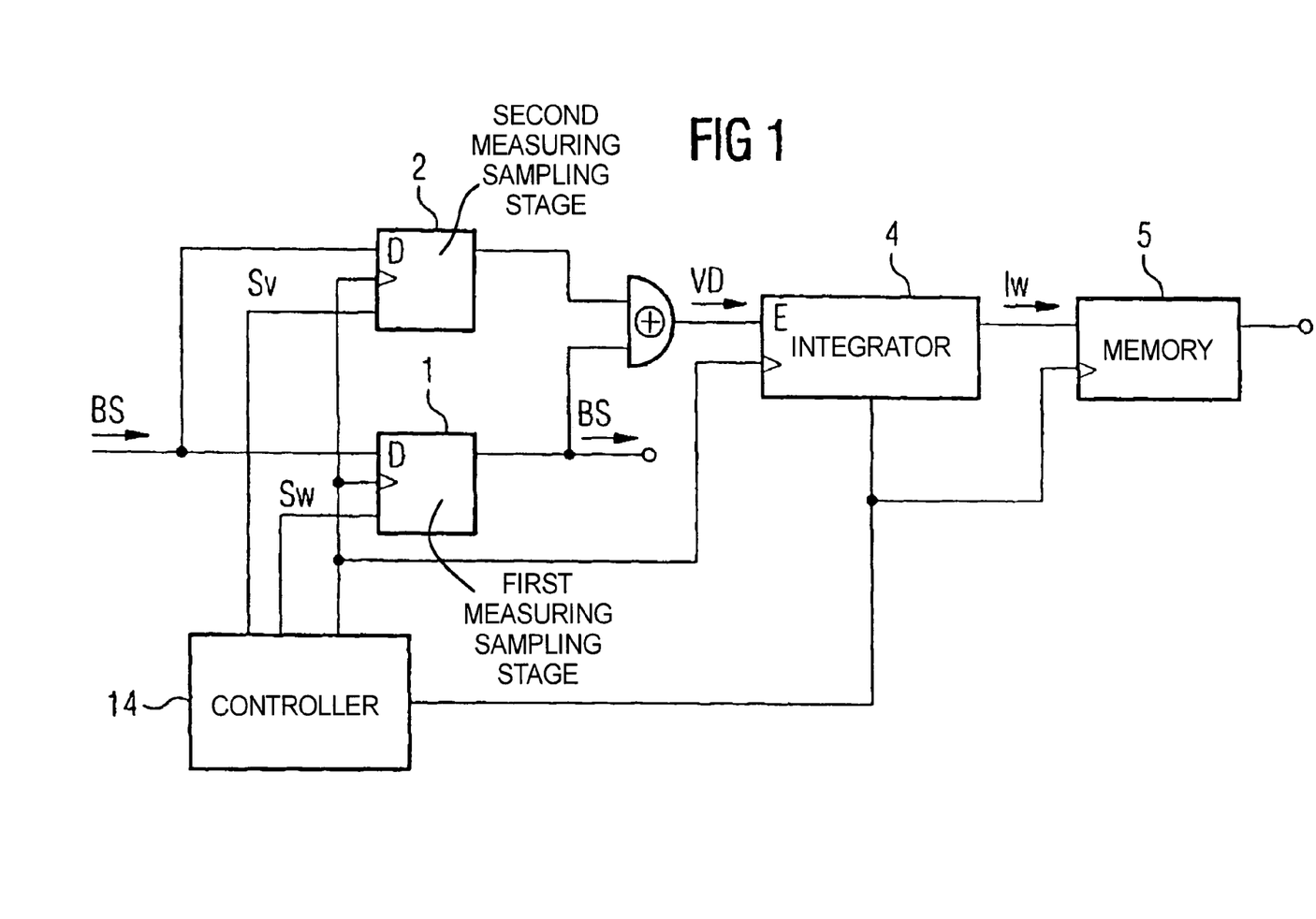
FIG. 1 is a schematic block diagram showing a measuring device for measuring a probability distribution.

A measuring device for assessing the signal quality is represented in FIG. 1. It includes a first sampling stage 1 in the "working channel", which (at the instant of the effective edge of the clock signal C1) samples the electrical binary signal BS present in the base band with a first, at least approximately optimum, threshold value Sw (w—working channel). The adjustable threshold value Sw expediently lies approximately midway between the two ideal signal levels, which represent a logical one and a logical zero. In parallel with this, the sampling by way of a second measuring sampling stage 2 takes place at the same time in a "measuring channel", the threshold value Sv (v—variable) being likewise variable. The outputs of the two sampling stages are combined via an exclusive-OR gate 3, which gives as an output signal a comparison value, which is a logical 1 in the case of unequal sampling. Within a measuring interval, the comparison values VD are summated by a (digital or analog) integrator 4. The summated comparison value Iw determined in this way is then written to a memory 5 of an evaluation unit (not represented) with an interval clock signal Tl, which also re-sets the counters.

This operation is repeated for, e.g., 200 different threshold values, until a distribution function that is as accurate as possible is obtained between the smallest and largest possible sampled value or threshold value.

Figure 2:
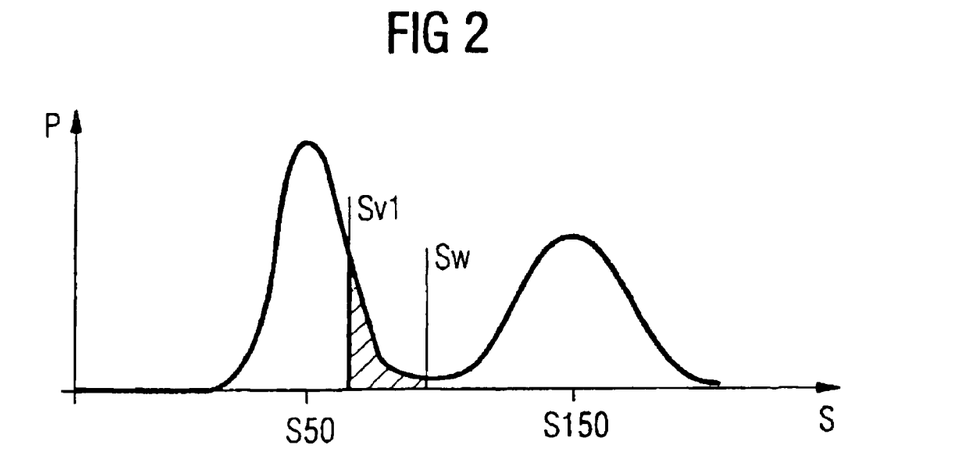
FIG. 2 is a graph showing a probability density distribution based on different threshold values.

For better understanding, the distribution density of sampled values of a received binary signal is represented in FIG. 2. This would be obtained—by contrast with the measurement with the device according to FIG. 1—if the amplitudes of the sampled values were measured directly. The horizontal axis gives the possible amplitudes of the sampled values Si; the distribution density P(Si) for the occurrence of sampled values with specific amplitudes S is represented on the vertical axis.

For the distribution density, $$P(S) = \frac{\sum Si}{\sum Bits}.$$

In the case of a depicted amplitude value S50, a first maximum occurs. This amplitude value corresponds approximately to the mean value for the logical zero. With increasing amplitude values, the distribution function decreases again, until it reaches a new maximum in the case of an amplitude value S150, which represents the average amplitude value for the logical one. The function subsequently falls again.

Figure 3:
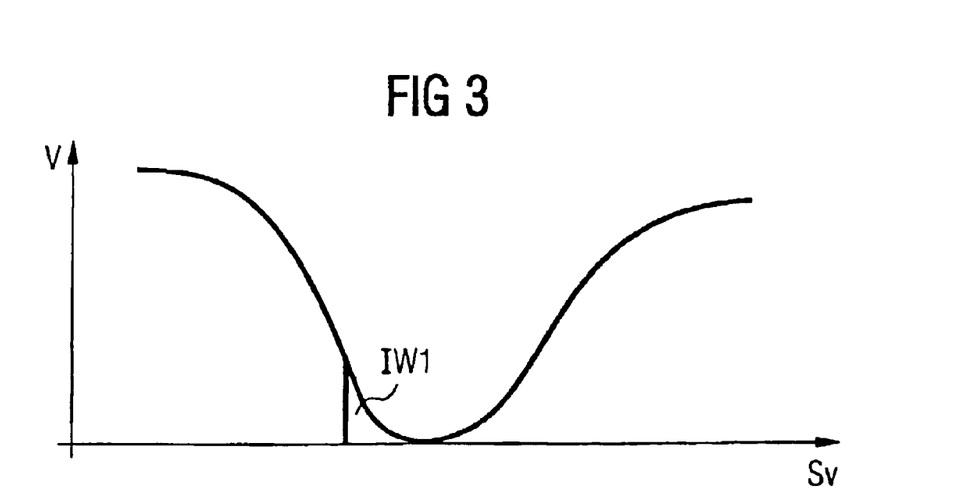
FIG. 3 is a graph showing a probability distribution measured with a circuit according to FIG. 1.

In the case of the measurement carried out with a measuring arrangement according to FIG. 1, however, the individual amplitude values are no longer sampled and stored, since this would require very fast circuits. By contrast, an assessment is made as to whether or not the sampled values in the two sampling stages coincide. Since, according to FIG. 1, the unequal sampled values are integrated, a minimum is obtained in the case of the distribution function V(S)

determined in FIG. 3 when the sampling threshold values Sw and Sv are identical. If the variable threshold value Sv is now reduced, deviations will occur ever more frequently as the difference between the threshold values increases. A very low variable threshold value Sv of the second decision-circuit stage 2 will therefore almost always bring about a threshold overshoot. Consequently, logical ones will predominate as sampled values in the measuring channel, although a logical zero was received as the bit (its level, however, being above the threshold). With threshold values lying above the held-constant threshold value Sw and continuing to increase, an increase of the distribution function is likewise obtained, since from this point on the sampling stage of the measuring channel emits the logical zero more frequently, since the required level is not reached by a logical one of the binary signal.

Since, in the case of the measuring device according to FIG. 1, all of the sampled values lying above (or below) the variable threshold value Sv1 are assessed, the measured distribution function, FIG. 3, corresponds to the integral of the distribution density function according to FIG. 2. Or, to put it another way, FIG. 2 is the absolute value of the derivative of the function represented in FIG. 3. An integration value IW1 for two specific threshold values Sw and Sv1 is depicted as an example.

A relatively exact, and therefore smooth, distribution curve is obtained only if the variable threshold is changed in very fine stages. However, this is also only the case whenever the measurements are adequately exact and are not subject to statistical fluctuations. The measuring intervals for the different sampling threshold values should therefore be chosen to correspond to the different summated comparison values. When only a few differences occur, the measuring intervals are increased, whereas when frequent differences occur the measuring intervals can be reduced.

The evaluation of the distribution density curves can take place in a way corresponding to a known method. It is generally customary to calculate a signal quality parameter Q:

$$Q = \frac{A}{\sigma_a + \sigma_b}$$

where A=b−a is the signal amplitude and σa and σb are the standard deviations in the case of an assumed Gaussian distribution.

More details can found in German patent document DE 19 812 078.8 or C. Glingener: "Modellierung und Simulation faseroptischer Netze mit Wellenlängenmultiplex" (Modelling and Simulation of Fiber-optic Networks with Wavelength Division Multiplexing]; WFT-Verlag, 1998, pages 102 to 118, both incorporated herein by reference.

Figure 4:
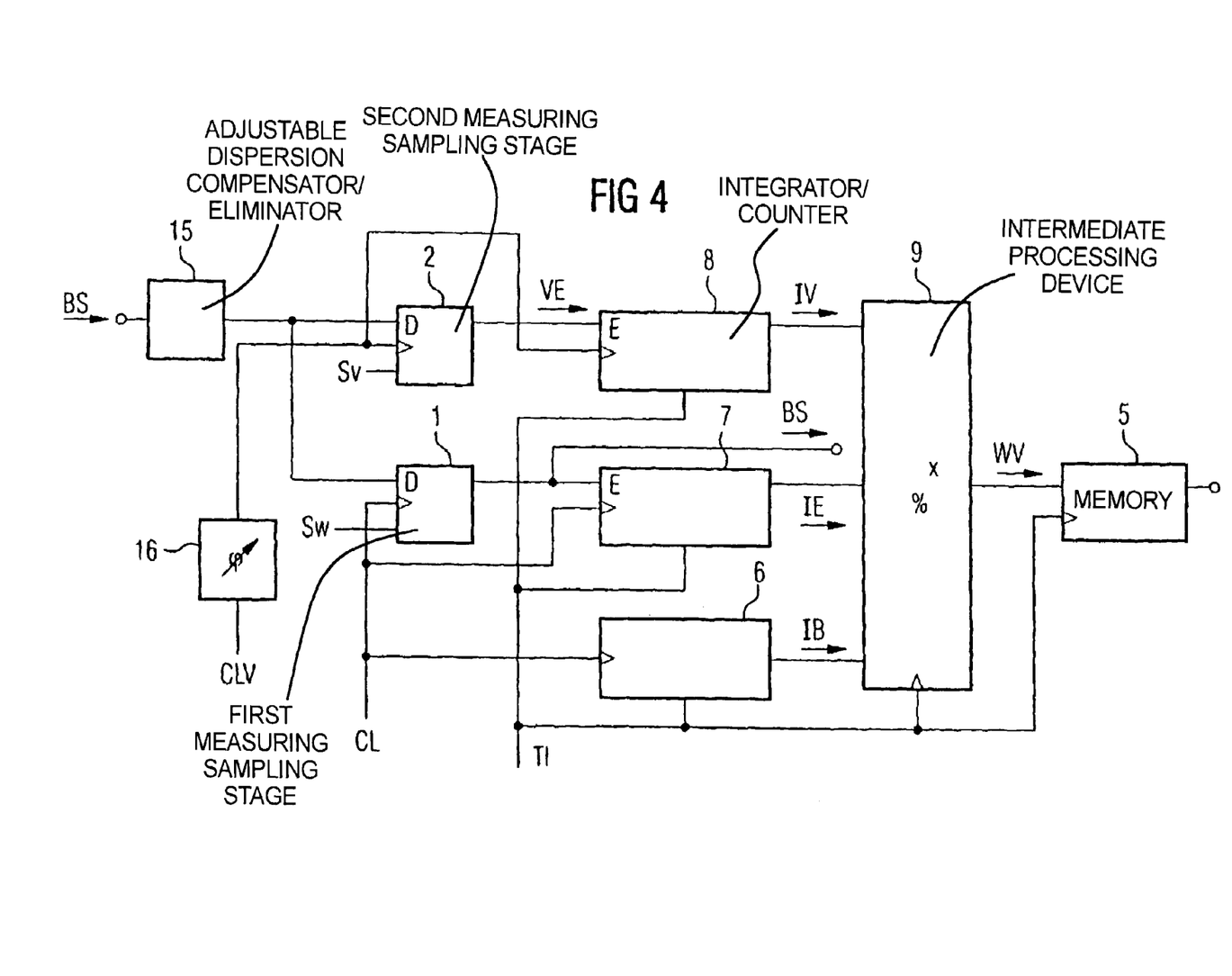
FIG. 4 is a schematic block diagram showing a further measuring device for measuring the probability distribution.

A further particularly advantageous device for measuring a probability distribution, from which the distribution density can likewise be derived, is represented in FIG. 4. This circuit again contains two sampling stages 1 and 2, but up to three counters or integrators 6, 7 and 8. The first counter 6 counts the number IB of bits during a measuring interval, the summated bit value. The second counter 7 is connected in the working channel to the output is of the sampling stage 1 and counts the number of logical ones, referred to as the second summated value IE, during a measuring interval. The third counter 8 is connected in the measuring channel to the output of the second sampling stage 2 and likewise counts the number IV of bits VE assessed with logical one in the case of different threshold values Sv, the first summated value IV. The summated values IB, IE and IV are fed at the end of a measuring interval to an intermediate processing device 9, in which the normalization takes place, or are initially written to the memory and are later normalized and processed. After that, the measuring operation is repeated with a changed sampling threshold, until the probability distribution WV(S) represented in FIG. 6 can be determined.

Figure 5:
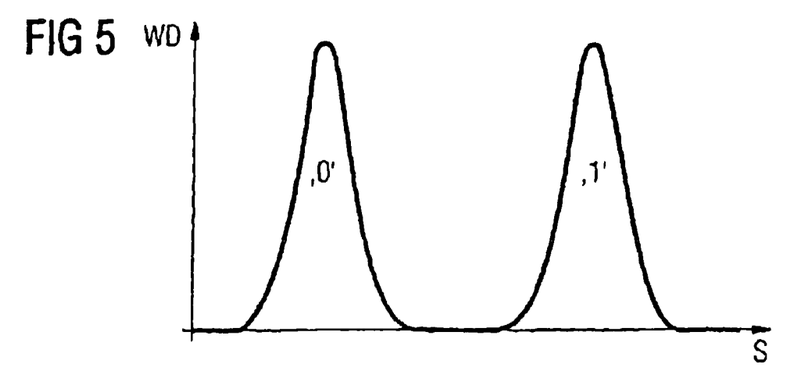
FIG. 5 is a graph showing an ideal probability density distribution.

If one initially assumes an equal distribution of logical ones and zeros of the binary signal BS, the probability density WD(S) represented in FIG. 5 would be obtained when evaluating the sampled values.

The measuring device according to FIG. 4, however, measures the probability of the occurrence of a specific binary state. If, at the beginning, such a low threshold value is used that all of the received signal values in the measuring channel lie above the threshold and are therefore assessed as logical ones, a greatest possible probability is determined. If the threshold value is then increased from measuring interval to measuring interval, the probability will initially be reduced steadily until, in the case of an average threshold value—assuming an equal distribution of logical zeros and ones—it lies around 0.5, to then decrease again to zero. The determination of the number of bits during a measuring interval serves for normalizing the measurement results in the case of measuring intervals of unequal length. For the probability distribution of logical zeros in the measuring channel, a complementary distribution function depicted by dashed lines would be obtained.

Figure 6:
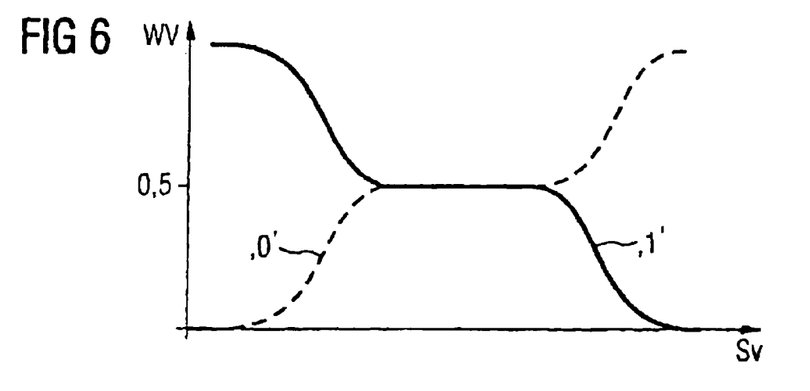
FIG. 6 is a graph showing a measured probability distribution for different threshold values.
Figure 7:
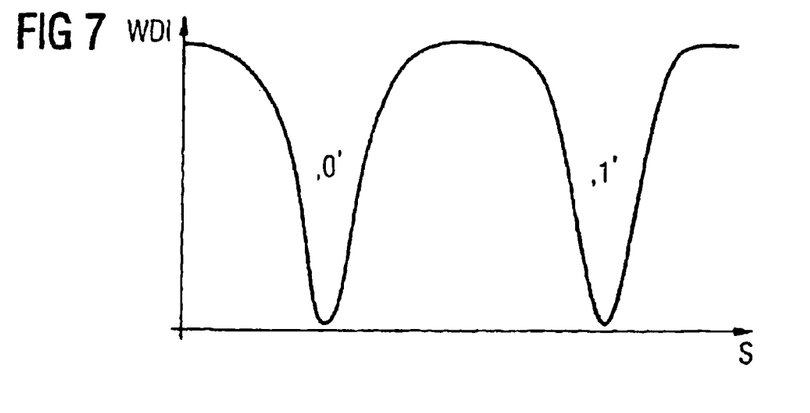
FIG. 7 is a graph showing a probability density derived from this measured probability distribution.

In a way corresponding to the relationships already indicated in the case of the measuring arrangement according to FIG. 1, it is possible, by differentiating the distribution function according to FIG. 6 and forming an absolute value, to determine the probability density WDI according to FIG. 7, which is "inverse" to the distribution density of the sampled values of the signal (or the probability density function of the logical zeros is determined, or this problem is avoided by absolute value formation).

In the case of the measuring arrangement, it is immaterial whether the occurrence of logical ones or logical zeros is assessed. As an alternative to the counting of the bits within a measuring interval, both sampled values zero and one can also be counted, since they go together to make up the total number of bits received. If there is an equal distribution of logical ones and zeros, it is also possible to dispense with the counter 7 summating the logical ones. On the other hand, the counter is required in order to eliminate the influence of an unequal distribution of zeros and ones to the greatest extent by forming the quotient of the summated values in the measuring channel and in the working channel.

Figure 8:
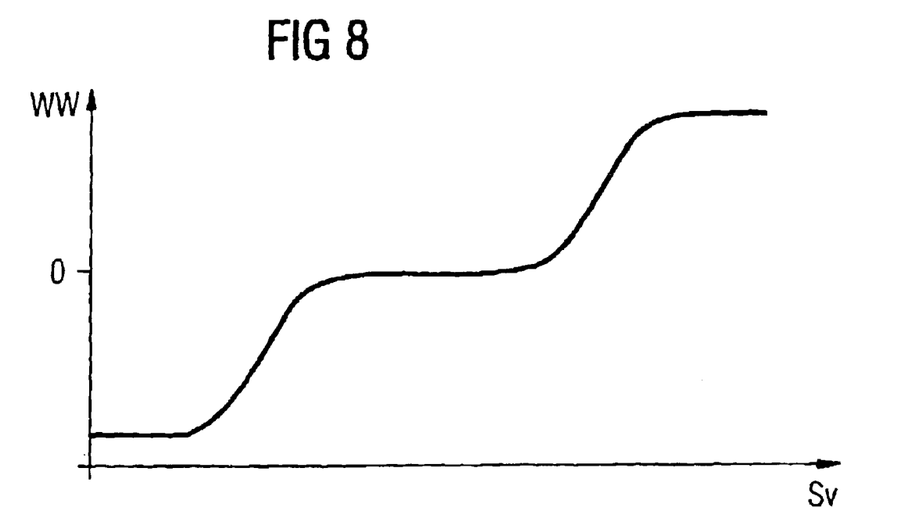
FIG. 8 is a graph showing a probability distribution of the binary states.
Figure 9:
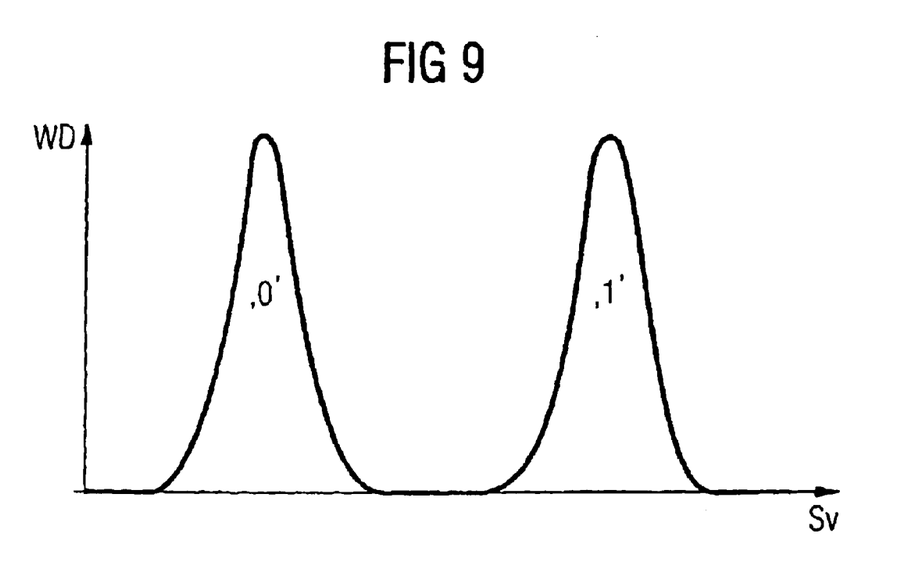
FIG. 9 is a graph showing the associated distribution density.

In a way corresponding to FIG. 8, the difference between the summated values IE–IV can also be evaluated for a binary state, here a logical one, for the first sampling stage 1 and the measuring sampling stage 2. This measure has approximately the same effect as that of the circuit indicated in FIG. 1: the differences between the working channel and the measuring channel are assessed. The difference formation can be combined with the quotient formation. In comparison with FIG. 6, there is a horizontal shift of the probability distribution function WW. The probability function can again be used to determine the probability density distribution represented in FIG. 9, which is particularly suitable for the evaluation. Since, however, the two functions can be mathematically transformed into each other, in principle the evaluation of the distribution function is also always possible.

Figure 10:
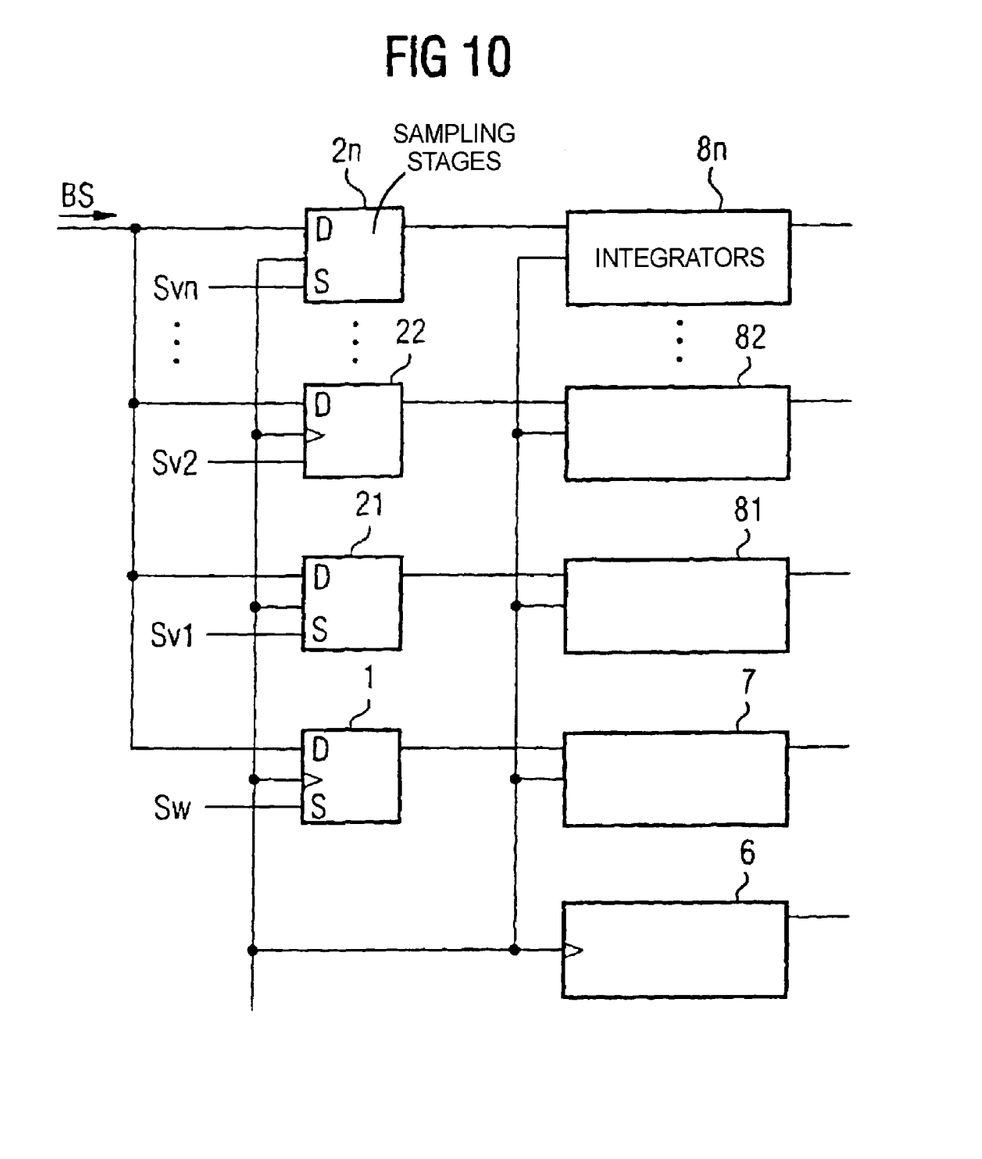
FIG. 10 is a schematic block diagram showing a variant of the further measuring device for faster measurement.

A measuring device allowing a reduction in the measuring time required overall for creating a probability distribution is represented in FIG. 10. If only one sampling stage with a variable threshold is provided, this threshold must be changed after each measuring interval for a new measurement. If, on the other hand, a plurality of sampling stages 21 to 2n with different threshold values Sv1–Svn are used, a plurality of measurements can be carried out simultaneously and the total measuring time can be correspondingly reduced. Only a little additional hardware expenditure is required for the sampling flip-flops and integrators 81 to 8n. The same also applies correspondingly to the measuring arrangement according to FIG. 1. It is not yet economical to create an arrangement with the same number of sampling stages as the number of necessary threshold values-however, in such an arrangement, only one measuring interval would be required.

For further measuring purposes, an embodiment of the arrangement may change the sampling instant of the measuring/sampling stage using a phase shifter 16 (FIG. 4), to which a clock signal CLV leading the regular clock signal CL is fed. If this measure is additionally carried out, the entire eye pattern can be acquired on the basis of statistical measurements.

Figure 11:
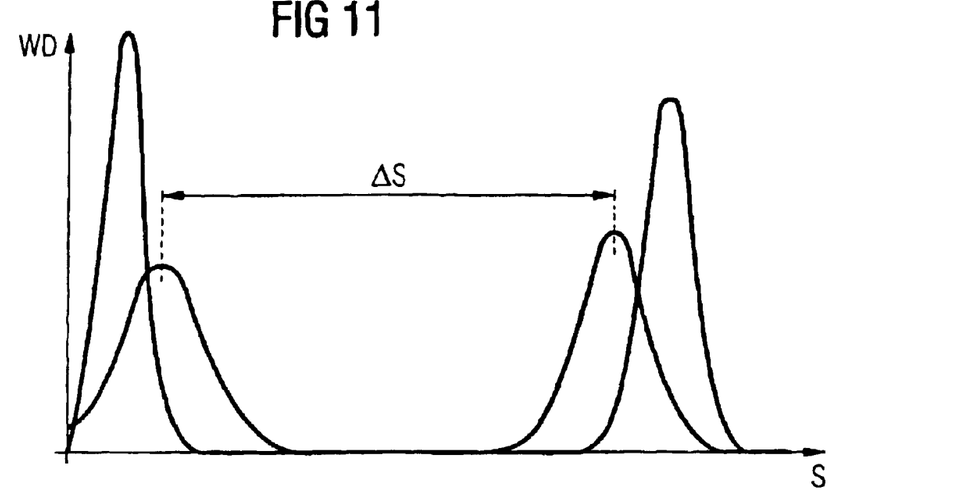
FIG. 11 is a graph showing probability density distributions based on the dispersion.
Figure 12:
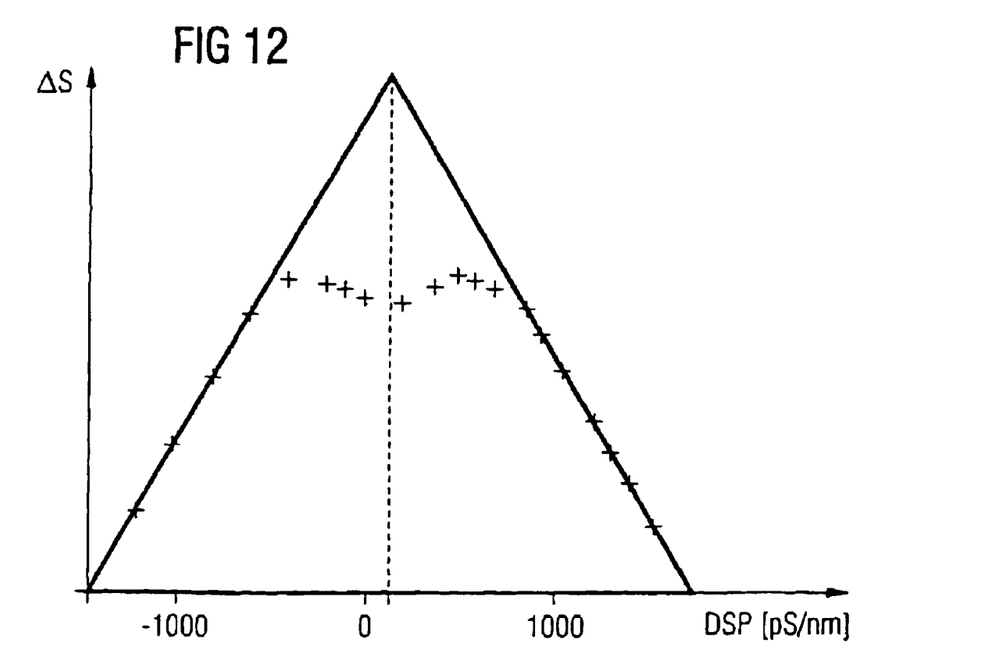
FIG. 12 is a graph showing the determination of the optimum dispersion compensation.

The dependence of the distribution density function in the case of different dispersion values is represented in FIG. 11. If there is a change in dispersion, the spacing of the maxima of the distribution density function changes. When a transmission system is being installed or optimized, the dispersion is increased or reduced—starting from a value of zero—with the aid of an adjustable dispersion compensator/emulator 15 connected into the signal path. The measurement of the probability distribution and the determination of the spacing $\Delta S$ between the maxima of the values for zero and one subsequently takes place in each case. If there are relatively great deviations of the dispersion from the optimum, there is a reduction in the spacings of the maxima for the occurrence of the sampled values assigned to the two binary signal values, both in the case of negative deviations and in the case positive deviations of the dispersion. In dependence on the change in dispersion, given in ps/nm (picoseconds/nanometer), the spacings between the maxima of the distribution density function are given on the y-axis in FIG. 12. The optimization is carried out by evaluating the spacing function $\Delta S$. For example, in a way corresponding to FIG. 12, the falling edges of the measuring curve are extended; their point of intersection determines the optimum dispersion. The measuring curves are again obtained with an arrangement according to FIGS. 1, 4 or 10.

Figure 13:
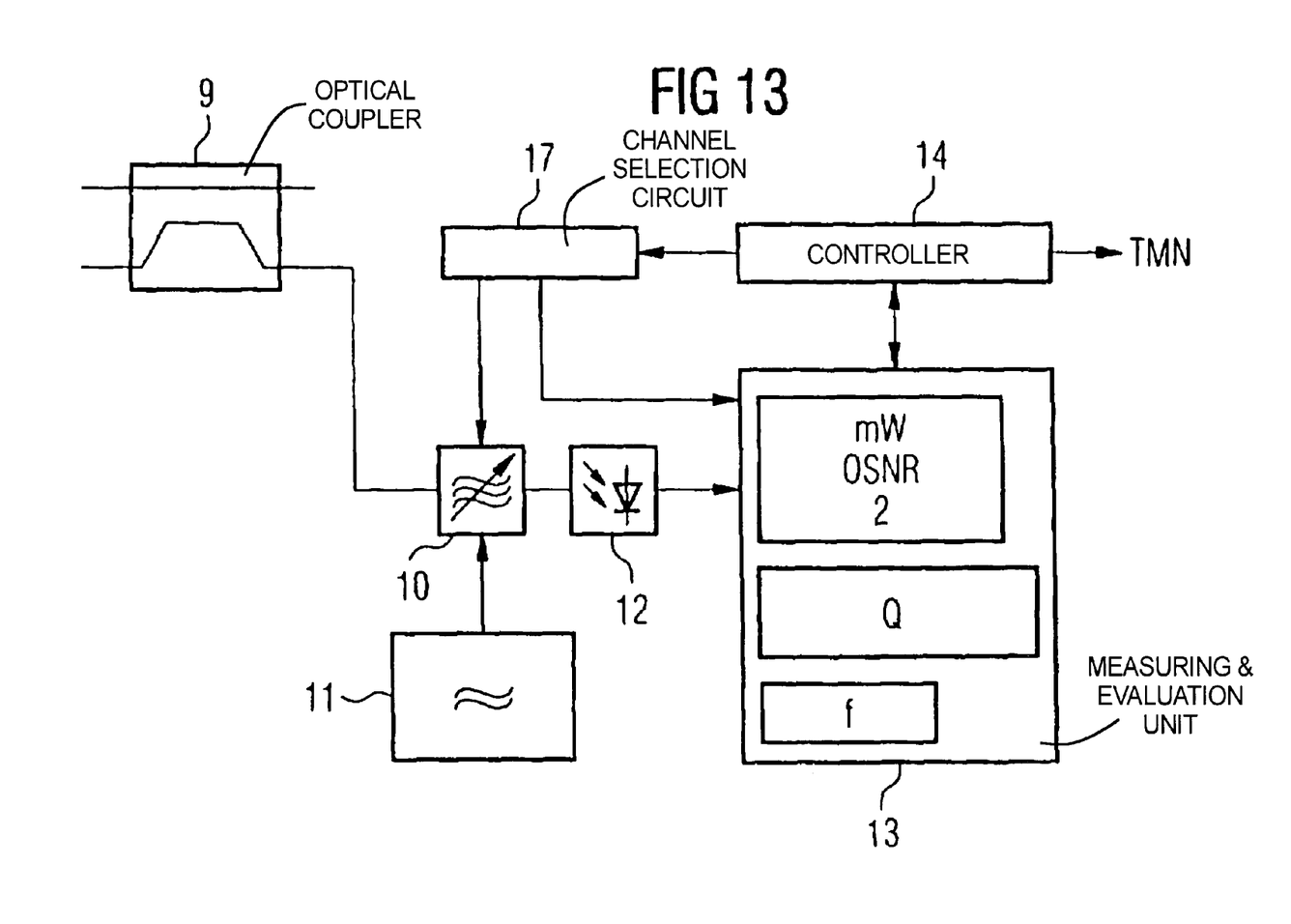
FIG. 13 is a schematic block diagram showing a measuring arrangement.

The measuring arrangement for wavelength-division multiplex signals (WDM signals) is represented in FIG. 13. Part of the binary signal is branched off by an optical coupler 9 and fed via a tuneable filter 10 and an optoelectronic transducer 12 to a measuring and evaluation unit 13 as an electrical baseband signal. This unit measures the most important channel parameters (such as channel power, wavelength, signal-to-noise ratio), but also carries out statistical measurements of the signal quality, as described above, in order, e.g., to be able to make statements concerning the bit error rate, which are transferred to a management system TMN.

The main part of the measuring device is an optical spectrum analyzer, with which main properties such as the level, wavelength and signal-to-noise ratio can be determined. The tuneable filter acts as a multiplexing device to allow the measurements to be carried out with reasonable expenditure. The wavelength of the tuned filter can be set with adequate accuracy with the aid of a calibrating device 11.

A controller 14 undertakes the successive testing of the individual WDM channels with the aid of a channel selection circuit 17 which determines the type of measurement. In the case of statistical measurements, it also determines the duration of the measuring intervals.

The above-described method and apparatus are illustrative of the principles of the present invention. Numerous modifications and adaptations will be readily apparent to those skilled in this art without departing from the spirit and scope of the present invention.

What is claimed is:

1. A method of measuring a distribution function for determining a signal quality in optical transmission systems, comprising the steps of:

sampling an optical binary signal in a working channel with a first threshold value, producing first sampling values;

additionally sampling said optical binary signal in a measuring channel with a second threshold value during a plurality of measuring intervals in which in each case said second threshold value is varied, producing second sampling values;

comparing respective said first sampling values with said second sampling values, producing comparison values;

integrating or summating said comparison values to produce, for each measuring interval, a summated comparison value;

storing said summated comparison values;

determining a distribution function of said comparison values as a function of said second variable threshold value after an adequate number of said measuring intervals; and improving said signal quality or optimizing said optical transmission system utilizing said distribution function.

2. A method of measuring a distribution function for determining a signal quality in optical transmission systems, comprising the steps of:

sampling an optical binary signal in a working channel with a first threshold value, producing first sampling values;

additionally sampling said optical binary signal in a measuring channel with a second threshold value during a plurality of measuring intervals in which in each case said second threshold value is varied, producing second sampling values;

additionally sampling said optical binary signal in a measuring channel with a second threshold value during a plurality of measuring intervals in which in each case said second threshold value is varied, producing second sampling values;

determining, for each said measuring interval, a first summated value in said measuring channel by integrating sampled logical zeros or ones;

storing said first summated values;

determining, for each measuring interval, a number of bits received as a summated bit value;

storing said summated bit values;

determining a probability function, after an adequate number of said measuring intervals, as a function of said variable second threshold value for an occurrence of a binary state from said stored first summated values and associated said summated bit values; and improving said signal quality or optimizing said optical transmission system utilizing said distribution function.

3. A method of measuring a distribution function for determining a signal quality in optical transmission systems, comprising the steps of:
- sampling an optical binary signal in a working channel with a first threshold value, producing first sampling values;
- additionally sampling said optical binary signal in a measuring channel with a second threshold value during a plurality of measuring intervals in which in each case said second threshold value is varied, producing second sampling values;
- determining, for each said measuring interval, a first summated value in said measuring channel by integrating sampled logical zeros or ones;
- storing said first summated values;
- determining, for each measuring interval, a second summated value in said working channel by integrating received zeros or ones;
- storing said second summated values;
- determining a probability function, after an adequate number of said measuring intervals, as a function of said variable second threshold value for an occurrence of a binary state from said stored first summated values and associated said second summated values; and
- improving said signal quality or optimizing said optical transmission system utilizing said distribution function.

4. The method as claimed in claim 3, further comprising the steps of:
- forming, after each measuring interval, a difference value between said first summated value determined in said measuring channel, and said second summated value determined in the working channel;
- storing said difference values for said measuring intervals; and
- determining, from said difference values, a probability function for and occurrence of logical sampled values.

5. The method as claimed in claim 4, further comprising the step of:
- determining a probability distribution for an occurrence of logical sampled values that considers said second summated values in the working channel or said summated value of the bits respectively assessed during a measuring interval.

6. The method as claimed in claim 1, wherein measuring intervals of different lengths are used.

7. The method as claimed in claim 1, wherein said sampling is synchronous.

8. The method as claimed in claim 1, wherein said sampling takes place in parallel in a plurality of measuring channels with different threshold values.

9. The method as claimed in claim 8, wherein said sampling takes place in parallel in a plurality of measuring channels with different threshold values during only one measuring interval.

10. The method as claimed in claim 1, further comprising the step of changing a sampling instant in the measuring channel after each measuring interval.

11. The method as claimed in claim 1, further comprising the steps of:
- measuring probability distributions with differently set dispersion values; storing measurement results; and
- obtaining, from said stored measurement results, an at least approximately optimum value for dispersion compensation.

12. The method as claimed in claim 1, further comprising the steps of:
- determining a probability density distribution; and
- deriving criteria for an assessment or optimization of signal quality are derived from said probability density distribution.

13. The method as claimed in claim 2, wherein measuring intervals of different lengths are used.

14. The method as claimed in claim 3, wherein measuring intervals of different lengths are used.

15. The method as claimed in claim 2, wherein said sampling is synchronous.

16. The method as claimed in claim 3, wherein said sampling is synchronous.

17. The method as claimed in claim 2, wherein said sampling takes place in parallel in a plurality of measuring channels with different threshold values.

18. The method as claimed in claim 3, wherein said sampling takes place in parallel in a plurality of measuring channels with different threshold values.

19. The method as claimed in claim 17, wherein said sampling takes place in parallel in a plurality of measuring channels with different threshold values during only one measuring interval.

20. The method as claimed in claim 18, wherein said sampling takes place in parallel in a plurality of measuring channels with different threshold values during only one measuring interval.

21. The method as claimed in claim 2, further comprising the step of changing a sampling instant in the measuring channel after each measuring interval.

22. The method as claimed in claim 3, further comprising the step of changing a sampling instant in the measuring channel after each measuring interval.

23. The method as claimed in claim 2, further comprising the steps of: measuring probability distributions with differently set dispersion values; storing measurement results; and
- obtaining, from said stored measurement results, an at least approximately optimum value for dispersion compensation.

24. The method as claimed in claim 3, further comprising the steps of: measuring probability distributions with differently set dispersion values; storing measurement results; and
- obtaining, from said stored measurement results, an at least approximately optimum value for dispersion compensation.

25. The method as claimed in claim 2, further comprising the steps of: determining a probability density distribution; and
- deriving criteria for an assessment or optimization of signal quality are derived from said probability density distribution.

26. The method as claimed in claim 3, further comprising the steps of:
- determining a probability density distribution; and
- deriving criteria for an assessment or optimization of signal quality are derived from said probability density distribution.

* * * * *